F. R. SIMMS.
SHAFT COUPLING.
APPLICATION FILED MAR. 4, 1919.
1,310,845.
Patented July 22, 1919.
2 SHEETS—SHEET 1.
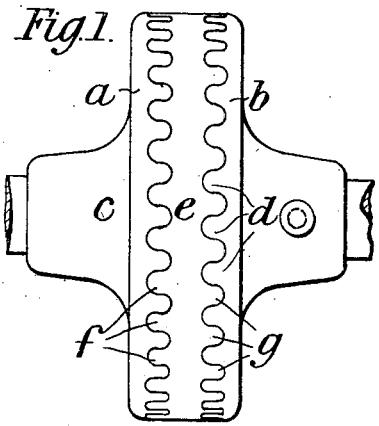
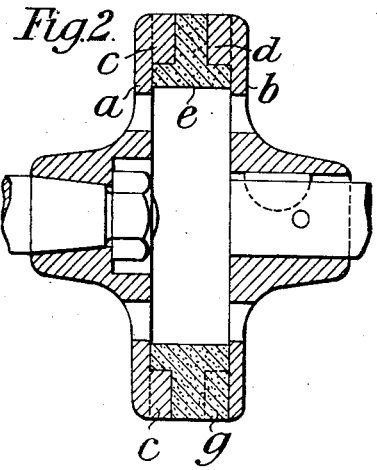
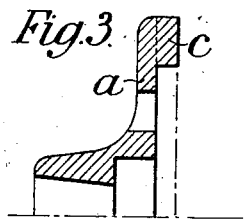
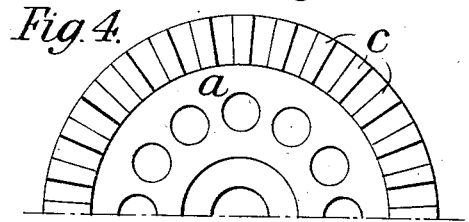
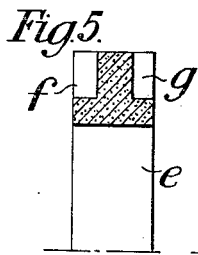
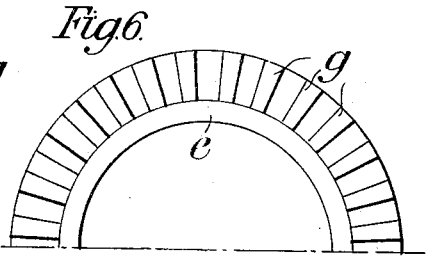
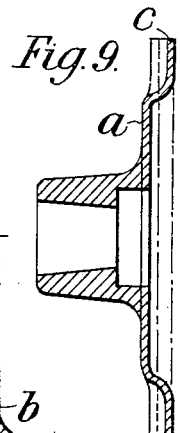
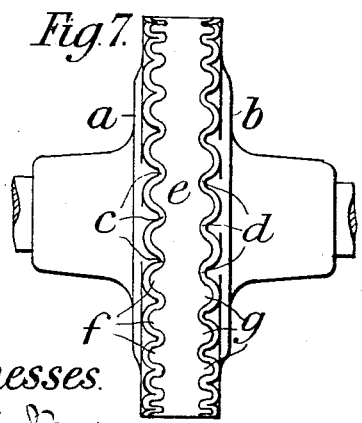
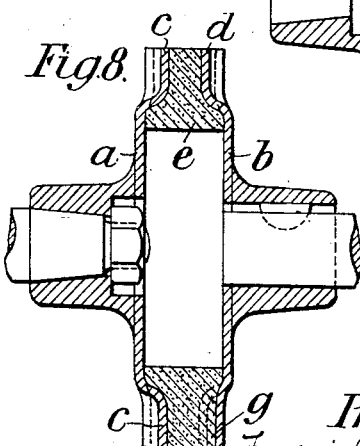
Witnesses
Inventor
Frederick R. Simms

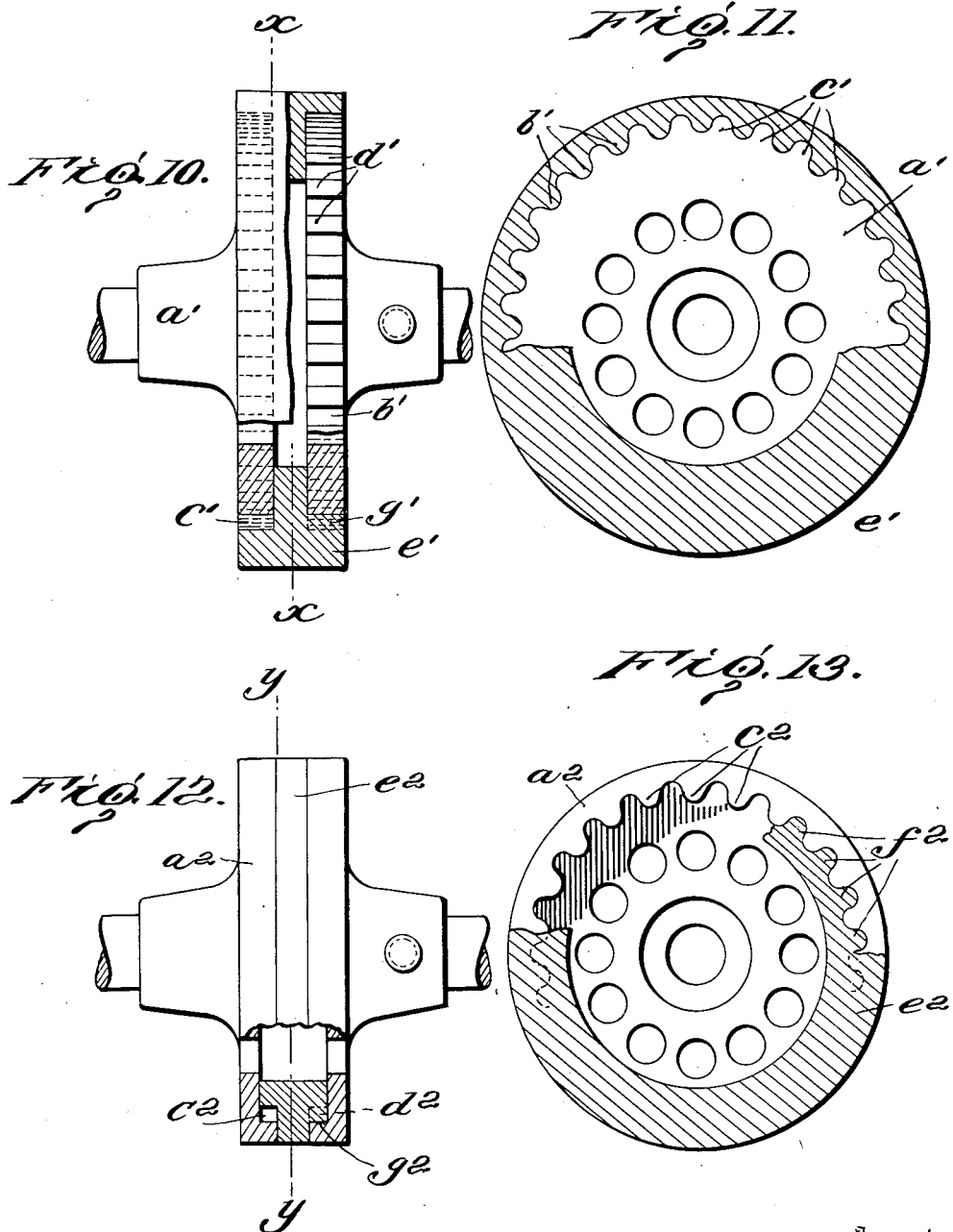

UNITED STATES PATENT OFFICE.

FREDERICK RICHARD SIMMS, OF RATHBONE PLACE, LONDON, ENGLAND, ASSIGNOR OF ONE-HALF TO SIMMS MOTOR UNITS, LIMITED, OF RATHBONE PLACE, LONDON, ENGLAND.

SHAFT-COUPLING.

1,310,845.  Specification of Letters Patent.  Patented July 22, 1919.

Application filed March 4, 1919. Serial No. 280,650.

*To all whom it may concern:*

Be it known that I, FREDERICK RICHARD SIMMS, a subject of the King of Great Britain, residing at Percy Buildings, Gresse street, Rathbone Place, London, England, have invented new and useful Improvements in Shaft-Couplings, of which the following is a specification.

This invention relates to couplings for uniting the adjacent ends of shafts, the object of the said invention being to provide a coupling which will allow of a very delicate relative angular adjustment of the two shafts being effected with great exactitude, the invention being especially applicable for connecting the crank-shaft of an internal-combustion engine to an ignition dynamo, but also being applicable for other purposes.

A coupling constructed according to my invention comprises two disks designed to be respectively fixed upon the adjacent ends of the two shafts to be connected, and provided on their opposing faces with teeth, the number of which on one disk differs from that on the other disk, each set of teeth engaging with corresponding teeth formed on the opposite faces of an intermediate ring which constitutes a driver between the two disks. With this arrangement if the two disks be moved in the same direction relatively to the ring, a distance of one tooth only, a very slight relative movement of the disks with relation to one another takes place.

The intermediate ring may be composed of metal, but in practice it is advantageous to construct it of india-rubber the resiliency of which will allow of the coupling yielding slightly in case the two shafts are not in accurate axial alinement.

My invention will be readily understood by reference to the accompanying drawing, in which:—

Figure 1 is an elevation of my improved coupling, and

Fig. 2 is a longitudinal section of the same.

Fig. 3 is a half section of one of the disks detached, and,

Fig. 4 is a face view of same.

Fig. 5 is a half longitudinal section through the intermediate ring, and,

Fig. 6 is a face view thereof.

Fig 7 and 8 are views similar to Figs. 1 and 2 respectively of a modification of the construction of the coupling.

Fig. 9 is a longitudinal section of one of the disks illustrated in Figs. 7 and 8 detached.

Fig. 10 is a side view partly in section, of a modification in which the disks have peripheral teeth engaging internal teeth on the connecting ring.

Fig. 11 is a section taken on line $x$—$x$ of Fig. 10.

Fig. 12 is a side view of another modification in which the disks have internal teeth engaging peripheral teeth on the connecting ring.

Fig. 13 is a section taken on line $y$—$y$ of Fig. 12.

$a$, $b$ indicate the two disks of the coupling, one of which, say, the disk $a$ is provided on its face with, say, 28 teeth $c$ and the disk $b$ is provided on the adjacent face with, say 27 teeth $d$, the said disks being represented in the drawing as attached to the adjacent ends of two shafts to be connected.

$e$ is the intermediate ring, which, as hereinbefore stated, is preferably made of india-rubber, the said ring having on one face 28 teeth $f$ designed to engage with the teeth $c$ and on the other side 27 teeth $g$ which engage with the teeth $d$.

With this construction it will be understood that the movement of the disk $a$ a distance of one tooth with relation to the ring $e$ will correspond to 1/28 part of 360° with relation to the disk $b$, and if the disk $b$ be moved a distance of one tooth it will correspond to an angular movement of 1/27 of a circle, and that of the disks be each moved a distance of one tooth with relation to the said ring in the same direction the relative movement of the two disks will be 1/27 of 1/28 or rather less than half a degree of angular movement.

It will be obvious that a greater amount of relative angular adjustment can be effected as required.

The construction of the coupling parts and the shape of the teeth can be varied if desired. In the arrangement shown in Figs. 1 to 3 each disk is represented as being cast in one piece. In the arrangement shown in Figs. 7 to 9 the teeth are formed by stamping a metal disk, such metal disk being secured by autogenous welding or otherwise to an independent boss. Also instead of constructing the disks with face teeth it will be obvious that they may be constructed with peripheral teeth or with internal teeth in which case the toothed ring with which these teeth engage, instead of being arranged between the two disks would surround the peripheries of the said disks, or be inclosed by overhanging parts of the disks.

These latter constructions are shown in Figs. 10 to 13. In the embodiment illustrated in Figs. 10 and 11, the disks $a'$ and $b'$ are provided with peripheral teeth $c'$ and $d'$ respectively and the intermediate ring $e'$ is provided with two sets of internal teeth $f'$ and $g'$, which mesh with the teeth $c'$ and $d'$.

In the modification shown in Figs. 12 and 13, the disks $a^2$ and $b^2$ are provided with internal teeth $c^2$ and $d^2$, respectively, and the ring $e^2$ has peripheral teeth $f^2$ and $g^2$ which mesh with said teeth.

Claims:

1. A shaft coupling comprising two disks designed to be secured respectively to the shafts to be connected and each provided with a series of teeth, and a connecting ring having two sets of teeth with which the teeth on the disks engage, the number of teeth on one disk being greater than the number of teeth on the other disk, substantially as described.

2. A shaft coupling comprising two disks having teeth on their adjacent faces and an intermediate ring provided with teeth on both sides with which the teeth on the disk will engage, the number of teeth on one disk being different from that on the other disk, substantially as described.

3. A shaft coupling comprising two disks secured to the ends of the shafts to be connected and each provided with an annular series of teeth, and a connecting ring having two annular sets of teeth with which the teeth on the disks engage, the number of teeth on one disk being greater than the number of teeth on the other disk.

FREDERICK RICHARD SIMMS.

Witnesses:
ARTHUR JAMES HALL,
R. BAGGOTT.